United States Patent [19]

Drzewinski

[11] Patent Number: 5,286,794
[45] Date of Patent: Feb. 15, 1994

[54] BLENDS OF POLYCARBONATE CONTAINING FLUORINATED-BISPHENOL A AND POLYVINYL CHLORIDE

[75] Inventor: Michael A. Drzewinski, Princeton Junction, N.J.

[73] Assignee: Enichem S.p.A., Milan, Italy

[21] Appl. No.: 891,032

[22] Filed: Jun. 1, 1992

[51] Int. Cl.$^5$ .................. C08L 69/00; C08L 27/06
[52] U.S. Cl. ............................ 525/147; 525/146
[58] Field of Search .............. 525/57, 133, 146, 147, 525/148

[56] References Cited

U.S. PATENT DOCUMENTS

| | | |
|---|---|---|
| 3,882,192 | 5/1975 | Elghani et al. |
| 4,105,711 | 8/1978 | Hardt et al. |
| 4,239,861 | 12/1980 | Braese et al. ............... 525/147 |
| 4,346,211 | 8/1982 | Krishnan et al. ............ 528/202 |
| 4,379,910 | 4/1983 | Mark et al. ................. 528/202 |
| 4,548,997 | 10/1985 | Mellinger et al. ........... 525/433 |
| 4,698,390 | 10/1987 | Robeson ..................... 525/147 |

OTHER PUBLICATIONS

Batelle Report—Identification of Major Developments in Polymer Blends/Alloys, vol. II, pp. 288-289, "Methods for Preparing Polymer Blends/Alloys".

*Primary Examiner*—David Buttner
*Attorney, Agent, or Firm*—Oblon, Spivak, McClelland, Maier & Neustadt

[57] ABSTRACT

Bisphenol A polycarbonate containing at least 15 mole % of 2,2-bis-(4-hydroxyphenyl)hexafluoropropane (6F-Bisphenol A) can be blended with polyvinyl chloride (PVC) to form a thermodynamically miscible, transparent, single phase blend at all compositions. Such blends are flame resistant as well as resistant to attack by acids, bases and many organic solvents.

7 Claims, No Drawings

BLENDS OF POLYCARBONATE CONTAINING FLUORINATED-BISPHENOL A AND POLYVINYL CHLORIDE

BACKGROUND OF THE INVENTION

1. Field of the Invention

This invention pertains to mixtures of polyvinyl chloride (PVC) and polycarbonates which contain at least 15 mole % of fluorinated bisphenol monomer units (F-PC) such as 2,2-bis-(4-hydroxyphenyl)hexafluoropropane (6F-bisphenol A), herein referred to as 6F-PC. Blends of F-PC and PVC result in thermodynamically miscible, single phase systems which are transparent throughout all compositions.

2. Discussion of the Background

Blends of polycarbonates and polyvinyl chlorides are known. Generally, polycarbonates exhibit properties such as high temperature stability, good dimensional stability, high impact strength, good stiffness and most notably good transparency. For these reasons, PC is used in a variety of applications including glass replacement, housings, medical devices and containers. Nevertheless, PC does have drawbacks such as poor scratch resistance, poor long-term U.V. resistance and stress birefringence which have to be dealt with, particularly in demanding optical applications. Furthermore, typical polycarbonates like bisphenol A PC do not meet many local and federal requirements for flame retardancy.

Polyvinyl chloride, on the other hand, is widely used in many molding and coating applications including film, sheet, pipe, wire and bottles. It suffers from poor processability and brittleness and thus is often plasticized for many applications. This, however, limits its upper use temperature.

Blends of PC and PVC would therefore be expected to eliminate the individual deficiencies of the respective components and result in a material having considerably improved mechanical and optical properties for a wide range of applications. As a matter of fact, pure mixtures of PC and PVC are disclosed in U.S. Pat. No. 4,239,861. These mixtures are reported to have better resistance to deformation at elevated temperatures but suffer from brittle behavior and lack of transparency at most composition ratios.

Unfortunately, blends of PC and typical polyvinyl chlorides are not thermodynamically miscible at most compositions and their mixtures result in opaque materials which are not acceptable for transparent, optical applications.

The term "thermodynamically miscible" blend is used in the art to define a polymer blend that mixes on the molecular level so as to form a single, homogeneous phase which exhibits only one glass transition. In contrast, the term "mechanically compatible" is taken to mean that mixing of the polymers is on a small scale but larger than the molecular level. Furthermore, "mechanically compatible" implies that the multiple phases exhibit good adhesion to one another so as to yield good mechanical properties. Although both thermodynamically miscible and mechanically compatible blends exhibit good mechanical properties, a thermodynamically miscible blend will generally be stronger and only thermodynamically miscible blends are transparent, owing to their single phase nature.

Molding compositions of PC and PVC which are partially transparent are disclosed in U.S. Pat. No. 4,105,711. These blends are endowed with high dimensional stability and high impact strength because the polycarbonate contains more than 50 mole of a tetramethylated bisphenol monomer and because it has also been previously compounded with a rubber impact modifier.

Similarly, PC and PVC mixtures which are opaque but have good ductility (low brittleness) have been disclosed by U.S. Pat. No. 3,882,192. This invention teaches that addition of an ABS graft copolymer to the mixture affords ductility and has the further advantage of being melt processable in the 170 to 220° C. range, avoiding degradation of the PVC. Moreover, it has been said (Battelle Report on Polymer Blends & Alloys—1986, Vol. II, page 288–289 and Chemical Week, pages 72–76, 1983) that such blends have too narrow a processing temperature range to assure a hypothetical commercial success.

Accordingly, the task existed to produce a PC/PVC blend which is transparent owing to the single phase nature of the component mixture, which demonstrates improved ductility over the prior art, and which can be melt processed at a wide temperature range for commercial viability and lack of PVC decomposition. This invention provides a miscible mixture of a polycarbonate and a polyvinyl chloride over all compositions which overcomes the disadvantages described above.

SUMMARY OF THE INVENTION

It is an object of this invention to provide a thermoplastic, melt processable composition which is a mechanically compatible, single phase, transparent blend of polycarbonate and polyvinyl chloride.

It is another object of this invention to prepare blends of polycarbonate and polyvinyl chloride in which these two polymers are thermodynamically miscible and form a stable, single phase material at all compositions.

DETAILED DESCRIPTION OF THE PREFERRED EMBODIMENTS

It is possible to achieve blends that are transparent and completely miscible containing:

(I) 1 to 99 weight % of polyvinyl chloride (PVC) and (II) 99 to 1 weight % of an aromatic polycarbonate containing at least 15 mole % of monomer units having fluorinated alkyl or fluorinated aryl side chains, such as 2,2-bis-(4-hydroxyphenyl)hexafluoropropane units (6F-PC).

Surprisingly, the polymer mixtures in accordance with this invention are thermodynamically miscible and mechanically compatible over the entire range of compositions, however, blends containing more than 5 weight % and preferably 10 weight % of either component are practically more interesting. The F-PC/PVC blends of this invention are clear and transparent in marked contrast to the prior art PC/PVC blends mentioned above which are opaque.

The fluorinated polycarbonate/polyvinyl chloride blends of this invention have excellent physical properties including improved thermal stability, UV resistance, dimensional stability and processability over PVC alone. Likewise, the alloys of this invention are more flame retardant, solvent resistant and can be processed at lower temperature than polycarbonate itself. Thus, by varying the ratio of the blend one may overcome the deficiencies of either PVC or PC while still maintaining transparency.

The materials of this invention can find application in the packaging industry as film or bottles, especially where higher heat and solvent resistance are sought. Another possible application for the materials of this invention is in the use of medical and chemical apparatuses, containers, or articles requiring transparent plastic parts with better chemical and flame resistance. The flame retardancy of these blends allows these materials to be used in various construction applications where typical polycarbonates do not possess the necessary requirements. Another very large potential application is for the use as hot water piping that may or may not need to be transparent. Currently, PVC piping cannot be used in such application and so metal is often the material of choice. Thus, the materials of this invention possess important commercial potential.

The polyvinyl chloride can be of a number of different varieties including extrusion, blow molding and injection moldable grades. The PVC can be made by various polymerization means including but not limited to emulsion, solution, suspension and bulk. Suitable catalysts include azo compounds, such as azobisisobutyronitrile; peroxides, such as dibenzoyl peroxide; and redox systems can be used as radical polymerization initiators. The weight average molecular weight is generally in the range of about 10,000 to about 2,000,000, although this is not critical to the basis of the invention. The preferred molecular weight is from 30,000 to about 300,000.

Generally preferred polyvinyl chloride is commercially available under such trade names as Geon (BF Goodrich) and Oxyblend (Occidental). Another preferred polyvinyl chloride material is commercially available from Polysciences, Inc. and has a molecular weight of 93,000. Another useful material is available from Scientific Polymer Products having an intrinsic viscosity of 0.55 which corresponds to a molecular weight of 90,000. It is also generally known that polyvinyl chloride includes not only 100% pure PVC but also a wide range of polymers, copolymers, mixtures and the like referred to as PVC or polyvinyl chlorides. The PVC polymer can typically contain comonomers such as vinyl acetate, vinyl alcohol, vinylidene chloride, diethyl fumarate, dimethyl maleate and acrylic esters. It may also be mixed with various plasticizers, fillers, flow modifiers and processing aids as well. Furthermore it can be post treated, such as by further chlorination.

The aromatic polycarbonates of the present invention have the formula

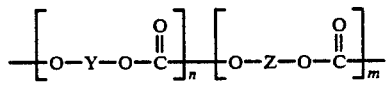

wherein Y is

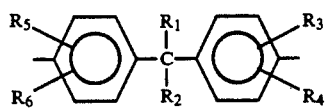

wherein $R_1$ and $R_2$ independently are fluorinated $C_1$–$C_6$ alkyl or fluorinated $C_6$–$C_{10}$ aryl groups; and $R_3$, $R_4$, $R_5$ and $R_6$ are each independently hydrogen, $C_1$–$C_3$ alkyl, chlorine, bromine or fluorine;

Z is a radical of the formula

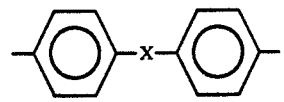

wherein X is $C_1$–$C_6$ straight or branched alkyl, carbonyl, sulfonyl, oxygen, sulfur or a single bond; n is an integer between 5 and 10,000, m is an integer of 0–10,000 provided $n \geq 0.15(m+n)$.

Examples of Z include 2,2-bis(4-hydroxyphenyl)propane, bis-(4-hydroxyphenyl)methane, 2,2-bis(4-hydroxy-3-methyphenyl) propane, 4,4-bis(4-hydroxyphenyl)heptane, 2,2-bis(4-hydroxyphenyl), 2,2-bis(4-hydroxyphenyl)ether, 2,2-bis(4-hydroxyphenyl)sulfone, 2,2-bis(4-hydroxyphenyl)ketone, 2,2-bis(4-hydroxyphenyl)thiol, 2,2-bis(4-hydroxyphenyl)-diphenylmethane, 2,2-bis(4-hydroxyphenyl) phenylethane, 2,2-bis(3,5-dimethyl, 4-hydroxyphenyl)propane. Further compounds can be found, for example, in "Chemistry and Physics of Polycarbonates" by H. Schnell (Interscience Publishers, Inc. 1964).

Examples of Y include 2,2-bis(4-hydroxyphenyl)-hexafluroproprane, 2,2-bis (4-hydroxyphenyl)hexafluoropropane, 2,2-bis(4-hydroxyphenyl)difluoromethane, 2,2-bis(4-hydroxyphenyl)pentafluorophenyl methane, 2,2-bis(3,5-difluoro, 4-hydroxyphenyl)propane, 2,2-bis(3,5-difluoro, 4hydroxyphenyl)methane, 2,2-bis(3,5-difluoro, 4-hydroxyphenyl)thiol, 2,2-bis(3,5-difluoro, 4-hydroxyphenyl)ether, 2,2bis(3,5-difluoro, 4-hydroxyphenyl)sulfone, 2,2-bis(3,5difluoro, 4-hydroxyphenyl)ketone, 2,2-bis(3,5-difluoro, 4hydroxyphenyl)-hexafluoropropane.

The polycarbonates are produced by reacting di-(monohydroxyaryl)-alkanes, dihydroxybenzenes and for halogen substituted derivatives thereof with derivatives of carbonic acid such as carbonic acid diesters, phosgene, bis-chlorocarbonic acid esters of di-(monohydroxyaryl)-alkanes, and the bis-chloro-carbonic acid esters of dihydroxybenzenes. These polymers can be manufactured by known processes as described in U.S. Pat. No. 4,548,997.

Aromatic polycarbonates are typically prepared using a molecular weight regulator, an acid acceptor and a catalyst. The molecular weight regulators which can be employed include phenol, cyclohexanol, methanol and para-tert-butylphenol. The acid acceptor can be either an organic or an inorganic base. Suitable organic bases include alkyl and aromatic amines such as pyridine, triethylamine, dimethylaniline and tributylamine. Suitable inorganic bases include the hydroxides, carbonates, bicarbonates and phosphates of alkaline or alkaline earth metals.

The catalysts which can be employed are those that promote esterification of the hydroxy monomer with the carbonic acid derivative including tertiary amines such as triethylamine, triisopropylamine, N,N,-dimethylaniline, quaternary ammonium compounds, such as tetraethylammonium bromide and benzyl trimethylammonium chloride, and quaternary phosphonium compounds such as N-butyltriphenylphosphonium bromide.

The preferred polycarbonate resins are prepared from mixtures of 2,2-bis-(4-hydroxyphenyl)propane (Bisphenol A) and 2,2-bis-(4-hydroxyphenyl)hexafluoropropane (6F-bisphenol A). Such resins are already known in the art. U.S. Pat. No. 4,346,211 describes a class of F-PC resins and their use in the manufacture of articles requiring higher heat distortion than traditional Bisphenol A PC. Another use of these F-PC resins is as flame retardants in blends with acrylic resins (U.S. Pat. No. 4,379,910).

The preferred blends of this invention are binary blends of PVC and F-PC. Additional polymers may also be present in minor amounts but must be miscible in order for the resultant blend to be clear and transparent. The total amount of any additional polymer(s) is generally less than 20 weight % (relative to combined weights of PVC and F-PC) with the ratio of PVC to F-PC remaining the same as binary blends, i.e., about 1 to 99 weight % (preferably 10–80%) F-PC and 99 to 1 weight % (preferably 90–20%) PVC.

The polymer blends of this invention have numerous applications owing to the transparency and improvement of properties hereinabove described. Furthermore, one may chose to add modifiers to the binary blend such as processing aids, stabilizers, antioxidants, fillers, pigments, dyes, impact modifiers and flame retardants to further extend the usefulness of this invention. Such additives may or may not effect the transparency depending on the miscibility of the additive with the blend.

Antioxidants include phenolics, hindered amines, thioesters and phosphite compounds. Suitable pigments and special color concentrates include a wide variety of chemical compounds, both organic and inorganic. Leading suppliers include Ferro, Harwick, Ciba-Geigy and Crowley.

Flame retardants include aluminum hydrates, halogenated compounds, antimony trioxide and phosphate esters sold by Mobay, Ferro, Harwick and Akzo.

Ultraviolet stabilizers are generally of the benzophenone, benzotriazolyl or nickel-organic types and are sold by Ciba-Geigy or BASF, Ferro and American Cyanamide.

Suitable fillers include aramid fibers, glass fibers, ceramic fibers, metal fibers, carbon fibers, glass beads, minerals such as calcium carbonate, kaolin, talc, micas and silicas.

Impact modifiers are selected for specific systems. They are generally classified for use in PVC, styrenics, olefinics and engineering resins. Examples include MBS modifiers sold by Rohm and Haas and AtoChem for use in PVC, PC and nylons. Kratons sold by Shell for use in styrenics and some engineering resins. EPDM rubbers are sold by many companies for use in polyolefins, etc. PC's are commercially impact modified with either the MBS or Kraton materials.

The mixing of the components of the blends of this invention can be undertaken by many means such as codissolution in solvent and by various commonly known methods of mechanical and thermal processing such as roll mixers, kneaders, blade mixers, screw extruders and the like. The resultant blend can be further processed/shaped by similar means most commonly referred to as extrusion and molding.

The resultant blends are transparent thermoplastic materials with a wide range of properties, in particular more favorable properties, than those exhibited by either individual component alone. For this reason the blends of this invention have many commercial applications, either directly or indirectly, as a result of the miscibility of PVC with F-PC. This includes production and use of PVC copolymers which make use of this miscibility so as to incorporate other moieties into the polycarbonate such as functionality for further reactivity or elastomers for low temperature, thick section toughness. Suitable comonomers include butadiene, isoprene, butylacrylate, vinyl acetate, vinyl alcohol, vinylidene chloride, diethyl fumarate, dimethyl maleate and acrylic esters. Thus, through this discovery, one can modify polycarbonate in order to overcome deficiencies such as notch sensitivity, poor thick section toughness, poor chemical resistance and poor flame retardance. On the other hand, F-PC can be used to modify PVC in such a manner so as to greatly improve its thermal stability, its dimensional stability and its processability.

Other features of the invention will become apparent in the course of the following descriptions of exemplary embodiments which are given for illustration of the invention and are not intended to be limiting thereof.

EXAMPLE 1

A 70/30 copolymer of Bisphenol A/6F-Bisphenol A polycarbonate was prepared by reaction of the phenolic monomers with diphenyl carbonate in the presence of the transesterification catalyst tetrabutyl-ammoniumtetraphenyl borate at high temperature, 220° C. for 20 minutes under argon then evacuate (15 mmHg) and raise temperature 10° C. every ten minutes until reaching 260° C., then 20 minutes at high vacuum (0.5 mmHg). The resultant copolymer was characterized and determined to contain 30% of the 6F-bisphenol monomer. DSC showed this material to have a glass transition of 145° C. This material was then solution blended in cyclohexanone with polyvinyl chloride (Scientific Polymer Products) at various weight ratios, coagulated in isopropanol, filtered and vacuum dried at 60° C. for several hours. Each blend was then tested by DSC after first being heated to 275° C. to remove any nonequilibrium effects and to simulate melt blending. Compression molding of these blends produced films which are highly transparent to the naked eye and quite ductile. The DSC was run at 20° C./minute from 25 to 275° C. and the glass transition of the mixtures recorded. The results are contained in Table 1. The single glass transition exhibited by these blends is consistent with well known behavior of thermodynamically miscible polymer blends.

Other features of the invention will become apparent in the course of the following descriptions of exemplary embodiments which are given for illustration of the invention and are not intended to be limiting thereof.

COMPARATIVE EXAMPLE 1

Traditional, 100% bisphenol A polycarbonate (Aldrich) and the PVC (Scientific Polymer Products) of Example 1 were solution blended in cyclohexanone at various weight ratios, coagulated in isopropanol, filtered and vacuum dried at 60° C. for several hours. Each blend was then tested by DSC after first being heated to 275° C. to remove any non-equilibrium effects and to simulate melt blending. The resultant blends were opaque when compression molded and exhibited two glass transitions as measured by DSC. The compression molded films were brittle and easy to break. The DSC results are contained in Table 1.

TABLE I

| 6-F PC/PVC | Example 1 | Comparative Example 1 |
|---|---|---|
| 100/0 | 145 | 150 & — |
| 85/15 | 131 | |
| 70/30 | 112 | 139 & 80 |

TABLE I-continued

| 6-F PC/PVC | Example 1 | Comparative Example 1 |
|---|---|---|
| 50/50 | 106 | |
| 30/70 | 101 | 139 & 85 |
| 15/85 | 90 | |
| 0/100 | 78 | — & 78 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic composition comprising a thermodynamically miscible blend of
   (I) 1 to 99% of polyvinyl chloride; and
   (II) 99 to 1 wt. % of an aromatic polycarbonate represented by the formula

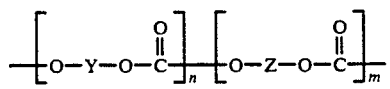

wherein Y is

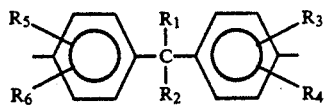

wherein $R_1$ and $R_2$ independently are fluorinated $C_1$-$C_6$ alkyl or fluorinated $C_6$-$C_{10}$ aryl groups; $R_3$, $R_4$, $R_5$ and $R_6$ are each independently hydrogen, $C_1$-$C_3$ alkyl, chlorine, bromine, or fluorine;

Z is a radical of the formula

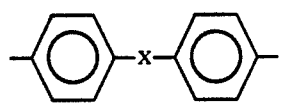

wherein X is $C_1$-$C_6$ straight or branched alkyl, carbonyl, sulfonyl, oxygen, sulfur or a single bond; n is an integer between 5 and 10,000, m is an integer of 0–10,000 provided $n \geq 0.15(m+n)$ wherein said composition has been melt blended and said blend of components I and II has one Tg.

2. The composition of claim 1, comprising 10–90 wt. % of component (I).

3. The composition of claim 1, comprising 35–90 % of component (I).

4. The composition of claim 1, wherein said polyvinylchloride has a number average molecular weight of 20,000 to 300,000.

5. The composition of claim 1, wherein $n \geq 0.35(m+n)$.

6. The composition of claim 1, wherein $n \geq 0.50(m+n)$.

7. The composition of claim 1, wherein m is 0.

* * * * *